(12) United States Patent
Narayanan et al.

(10) Patent No.: US 6,485,851 B1
(45) Date of Patent: Nov. 26, 2002

(54) POWER GENERATION IN FUEL CELLS USING LIQUID METHANOL AND HYDROGEN PEROXIDE

(75) Inventors: Sekharipuram R. Narayanan, Altadena, CA (US); Thomas I. Valdez, Covina, CA (US); William Chun, Los Angeles, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 09/160,209

(22) Filed: Sep. 23, 1998

Related U.S. Application Data
(60) Provisional application No. 60/059,789, filed on Sep. 23, 1997.

(51) Int. Cl.[7] .................................................. H01M 8/04
(52) U.S. Cl. ............................. 429/17; 429/19; 429/13; 429/39; 429/42
(58) Field of Search .............................. 429/39, 42, 115, 429/13, 17, 19

(56) References Cited

U.S. PATENT DOCUMENTS

| | | | | |
|---|---|---|---|---|
| 4,349,613 A | * | 9/1982 | Winsel | 429/17 |
| 5,141,823 A | * | 8/1992 | Wright et al. | 429/19 |
| 5,445,905 A | * | 8/1995 | Marsh et al. | 429/27 |
| 5,599,639 A | * | 2/1997 | Sansone et al. | 429/33 |
| 5,773,162 A | * | 6/1998 | Surampudi et al. | 429/39 |

* cited by examiner

*Primary Examiner*—Laura Weiner
(74) *Attorney, Agent, or Firm*—Fish & Richardson P.C.

(57) ABSTRACT

The invention is directed to an encapsulated fuel cell including a methanol source that feeds liquid methanol ($CH_3OH$) to an anode. The anode is in electrical communication with a load that provides electrical power. The fuel cell also includes a hydrogen peroxide source that feeds liquid hydrogen peroxide ($H_2O_2$) to the cathode. The cathode is also in communication with the electrical load. The anode and cathode are in contact with and separated by a proton-conducting polymer electrolyte membrane.

23 Claims, 2 Drawing Sheets

POWER GENERATION IN FUEL CELLS USING LIQUID METHANOL AND HYDROGEN PEROXIDE

CROSS REFERENCE TO RELATED APPLICATIONS

This application claims the benefit of the U.S. Provisional Application No. 60/059,789, filed on Sep. 23, 1997, which is incorporated herein by reference.

STATEMENT AS TO FEDERALLY SPONSORED RESEARCH

The invention described herein was made in the performance of work under a NASA contract, and is subject to the provisions of Public Law 96-517 (35 U.S.C. 202) in which the Contractor haselected to retain title.

FIELD OF THE INVENTION

The present invention relates to the field of fuel cells. In particular, the present invention relates to electrochemical fuel cells where oxidation and reduction reactions occur causing changes in the free energy and electrical energy.

BACKGROUND OF THE INVENTION

In an organic and air fuel cell, an organic fuel is oxidized at the anode and an oxygen source is reduced at the cathode. For example, the organic fuel may be methanol, formaldehyde, or formic acid, which is oxidized and reacted with water to produce carbon dioxide and $H^+$ protons (or hydronium ions, $H_3O^+$). At the cathode, oxygen in air is reduced and combined with $H^+$ protons (or hydronium ions) to form water. In the context of the invention, protons and hydronium ions are used interchangeably. An exemplary direct organic fuel cell is shown in U.S. Pat. No. 5,599,638 to Surampudi et al.

Surampudi et al. discusses the advantages and disadvantages of known indirect, or reformer fuel cells and direct oxidation fuel cells. It also discusses the problems associated with known electrode structures, and their fabrication and use in fuel cells thereof. For example, electrodes made by conventional methods lacked adequate porosity and wetting during use. Surampudi et al. solves such problems by employing a solid polymer membrane for conducting protons, such as a perfluorinated sulfonic acid polymer membrane. Preferably, the proton-conducting membrane is NAFION™ which is a co-polymer of tetrafluoroethylene and perfluorovinylether sulfonic acid.

In Surampudi et al., the problems associated with prior organic fuel cells (i.e., toxicity, corrosiveness, expensive, poor performance, and complex electrode structure and fabrication) were overcome, in part, by employing the proton-conducting membrane. The primary benefit of using the membrane was that it became practical and feasible to use methanol as the organic fuel. Methanol is desirable because it is relatively non-toxic, non-corrosive, inexpensive and in abundant supply. Methanol also performs well providing a high current density. The use of methanol also allows the electrode structure and fabrication procedure to be simplified producing a more effective electrode.

However, there still exists a need for an organic fuel cell capable of using an alternative oxygen source. In some fuel cell applications, air is absent or available in only limited quantities. For example, submarines and other underwater applications have little to no oxygen available for fuel consumption. Low noise signature, high volume and high specific energy density are also desirable for such underwater applications. High energy fuel cells based on pure compressed hydrogen and oxygen gas are disadvantageous for several reasons. The compressed tanks present safety concerns. The compressed tanks are also heavy and take up a lot of space which are impracticable or undesirable for some applications. Such cells also present other environmental and safety problems.

A need also exists for an oxygen source that is liquid around room temperature so that an electrode for use with liquids may be employed. In some applications, the gas diffusion electrode disclosed in Surampudi et al. may be undesirable. [please describe advantages and disadvantages of liquid v. gas diffusion cell]

As can be appreciated, it would be desirable to provide improved fuel cells that overcome the disadvantages associated with the liquid methanol and oxygen gas fuel cell.

SUMMARY OF THE INVENTION

Hence the various general objects of the invention set forth above are achieved. Other objects and advantages of the invention will be apparent from the detailed description set forth below.

One aspect of the present invention is a fuel cell comprising an electrical load, an anode including a catalyst, a cathode including a catalyst, a proton conducting membrane, a methanol source, and an $O_2$ source that is liquid at room temperature. Preferably, the $O_2$ source is hydrogen peroxide. Preferably, the proton conducting membrane is constructed from a perfluorinated sulfonic acid polymer. Preferably, the proton conducting membrane is constructed from a co-polymer of tetrafluoroethylene and perfluorovinylether sulfonic acid. Preferably, the anode includes a platinum-ruthenium catalyst. Preferably, the cathode includes a platinum catalyst. Preferably, the catalysts are particles in supported or unsupported layer configuration on a carbon fiber sheet backing. Preferably, the cathode includes an ion conductor and a catalyst layer comprising the catalyst, an oxygen solvent agent, and a hydrophilic wetting agent, and wherein the anode includes an ion conductor and a catalyst layer comprising the catalyst, and a hydrophilic wetting agent. Preferably, the wetting agent is a compound having perfluorocarbon moieties, and the ion conductor is a carbon fiber sheet backing. Preferably, the wetting agent is a material selected from the group consisting of polytetrafluoroethylene and a co-polymer of tetrafluoroethylene and perfluorovinylether sulfonic acid. Preferably, the oxygen solvent agent is a material selected from the group consisting of a co-polymer of tetrafluoroethylene and perfluorovinylether sulfonic acid and a polytetrafluoroethylene. Preferably, the fuel cell further comprises a separator for maintaining concentration of the hydrogen peroxide in the cathode and a pump for recycling the hydrogen peroxide to the cathode. Preferably, the separator includes a hydrogen peroxide selective membrane. Preferably, the fuel cell further includes an evaporator and condenser for conserving water removed by the separator. Preferably, the fuel cell further comprises a pump for recycling unreacted methanol to the anode. Preferably, the hydrophilic wetting agent is a member selected from the group consisting of a polymeric perfluorosulfonic acid, a polyhydrocarbon sulfonic acid, a polyetherketonesulfonic acid, a polyethersulfone sulfonic acid and a polybenzimidazole. Preferably, the methanol is in a concentration of about 0.25 to 3.0 molar. Preferably, the hydrogen peroxide is in a concentration of about 1–30% volume/volume. Preferably, the hydrogen peroxide is in a concentration of about 3–5% volume/volume.

Another aspect of the invention includes a method of generating electrical energy in a fuel cell comprising the acts of electrochemically reacting methanol in an anode chamber, and electrochemically reacting hydrogen peroxide in a cathode chamber. The method may further include the acts of recycling unreacted methanol to the anode chamber, maintaining an electrochemically sufficient concentration of hydrogen peroxide, and recycling unreacted hydrogen peroxide to the cathode chamber.

BRIEF DESCRIPTION OF THE DRAWINGS

The objects and advantages of the present invention will become more readily apparent after reviewing the following detailed description and accompanying drawings, wherein.

DETAILED DESCRIPTION OF THE INVENTION

Figure 1:
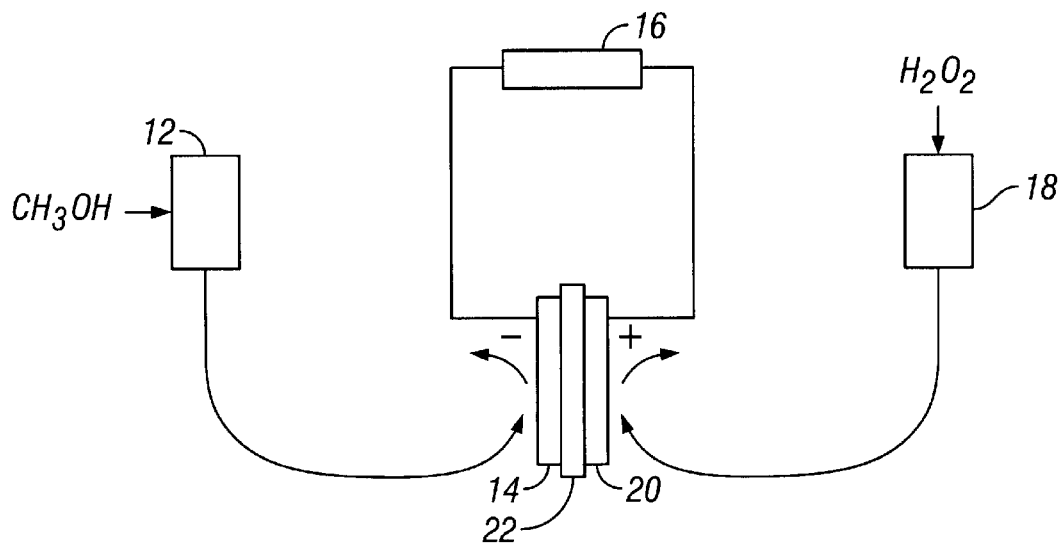
FIG. 1 shows a schematic diagram of an exemplary fuel cell of the present invention.

Referring to the figures, the preferred embodiments of the invention are described herein. As shown in FIG. 1, the encapsulated fuel cell 10 of the present invention includes a methanol source that feeds liquid methanol ($CH_3OH$) to an anode 14. The anode 14 is electrical communication with a load 16 that provides electrical power. The fuel cell 10 also includes a hydrogen peroxide source 18 that feeds liquid hydrogen peroxide ($H_2O_2$) to the cathode 20. The cathode 20 is also in communication with the electrical load 16. The anode 14 and cathode 20 are in contact with and separated by a proton-conducting polymer electrolyte membrane 22.

Preferably, the anode 14 is formed from platinum-ruthenium alloy particles in the form of fine metal particles. Platinum may also be alloyed with tin, iridium, osmium or rhenium to form the electrocatalyst. For the preferred platinum-ruthenium catalyst, the fine metal particles may be loaded onto a backing paper in the range of about 0.5–4.0 mg/cm$^2$. However, electro-oxidation is more efficient at higher loading levels. Preferably, the platinum comprises 10–90 atom percent of the alloy. Preferably, the catalyst particles are coated with a wetting agent to improve its wetting property. Preferably, the wetting agent is a co-polymer of tetrafluoroethylene and perfluorovinylether sulfonic acid, such as NAFION™. Other variations of the anode and its method of fabricating thereof is shown in U.S. Pat. No. 5,599,638 to Surampudi et al., which is incorporated herein by reference.

The metal particles may be unsupported (i.e., dispersed on high surface area carbon) or supported. The high surface area carbon may be Vulcan XC-72A available from Cabot, Inc, USA. A carbon fiber sheet backing (not shown) may be used to make electrical contact with the fine metal electrocatalyst. Commercially available TORAY™ paper may be used as the electrode backing sheet. A supported alloy catalyst on the TORAY™ paper backing is available from E-Tek, Inc. of Framingham, Mass. Alteratively, both unsupported and supported electrocatalysts may be prepared by chemical methods, combined with TEFLON™ binder and spread on the TORAY™ paper backing to produce the anode.

The cathode 20 is constructed to be hydrophilic in nature so that the hydrogen peroxide wets the entire catalyst layer. The electrocatalyst and backing layers are primarily made of hydrophilic materials. The catalyst layer also includes an oxygen solvent agent having a high oxygen solubility which improves utilization of the hydrogen peroxide. The oxygen solvent agent also preferably conducts protons. For example, the oxygen solvent agent may be a polytetrafluoroethylene (such as TEFLON™), a co-polymer of a tetrafluoroethylene and a perfluorovinylether sulfonic acid (such as NAFION™ which is available in a dispersed form from DuPont) or a compound having perfluorocarbon moieties.

Preferably, the catalyst layer includes a catalyst, an oxygen solubility-inducing material and a hydrophilic wetting agent. The catalyst is preferably platinum. The catalyst may be a suitable catalyst for hydrogen peroxide, such as silver, tungsten oxide, ruthenium, molybdenum or alloys and combinations thereof. The catalyst layer is supported or unsupported on a backing layer in a similar manner discussed herein respecting the anode. The catalyst layer may also include a hydrophilic wetting agent to improve wetting of the layer. Preferably, the hydrophilic wetting agent is a co-polymer of tetrafluoroethylene and perfluorovinylether sulfonic acid, such as NAFION™. The hydrophilic wetting agent may also be a polymeric perfluorosulfonic acid, a polyhydrocarbon sulfonic acid, a polyetherketonesulfonic acid, a polyethersulfone sulfonic acid or a polybenzimidazole.

As shown in FIG. 1, the fuel cell also includes a proton conducting, cation-exchange membrane 22. The membrane 22 is laminate or otherwise adhered to the anode 14 and cathode 20 as described in Surampudi et al. which is incorporated herein by reference. The membrane 22 is a solid polymer electrolyte. Preferably, the membrane is constructed from a perfluorinated sulfonic acid polymer suitable for making a membrane. An exemplary material is a co-polymer of tetrafluoroethylene and perfluorovinlyether sulfonic acid, such as NAFION™. The membrane may also be made of a modified perfluorinated sulfonic acid polymer, a polyhydrocarbon sulfonic acid or a composite thereof of two or more proton exchange membrane materials.

At the anode 14, liquid methanol is reduced producing carbon dioxide gas according to the following reaction: $CH_3OH(l)+H_2O(l) \rightarrow CO_2(g)+6H^{+}+6e^{31}$. At the cathode 20, liquid hydrogen peroxide is oxidized according to the following reaction: $H_2O_2(l)+2H^{+}+2e^{-} \rightarrow 2H_2O(l)$. The protons generated at the anode 14 permeate through the membrane 22 to the cathode 20 which react with the hydrogen peroxide. The carbon dioxide gas bubbles off from the anode chamber side of the fuel cell.

Figure 2:
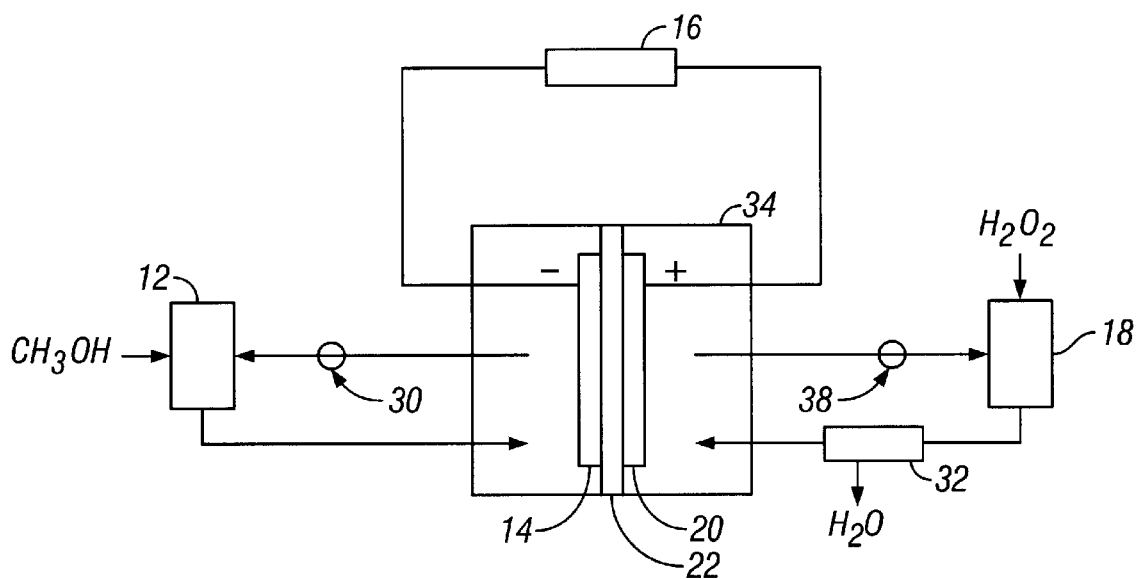
FIG. 2 shows a schematic diagram of another exemplary fuel cell of the present invention employing recycling equipment on the methanol and hydrogen peroxide lines.

Shown in FIG. 2 is an alternative embodiment of the fuel cell apparatus of the present invention. The fuel cell 10 includes the methanol source 12, anode 14, load 16, hydrogen peroxide source 18, cathode 20, and membrane 22 of FIG. 1 plus a pump 30 for recycling the unreacted methanol.

In addition, as shown in FIG. 2, the fuel cell 10 may further include a pumped recycle line 38 on the hydrogen peroxide side of the cell 10 and a housing 34. However, as the cell operates, the hydrogen peroxide source 18 becomes increasingly diluted because water is produced at the cathode. Therefore, a water separation device 32 is employed to concentrate the hydrogen peroxide. The water separation device 32 include a membrane having a low diffusivity for hydrogen peroxide and a high diffusivity for water. For example, a NAFION membrane will remove water from the aqueous solution of hydrogen peroxide. Other suitable membranes know in the art for such separation may also be used. Flowing air may also be used to remove water that permeates the membrane by evaporation. The evaporated water may be conserved by condensation techniques. The water removal rate is controlled to maintain suitable hydrogen peroxide concentrations in the fuel cell.

EXAMPLE 1

Figure 3:
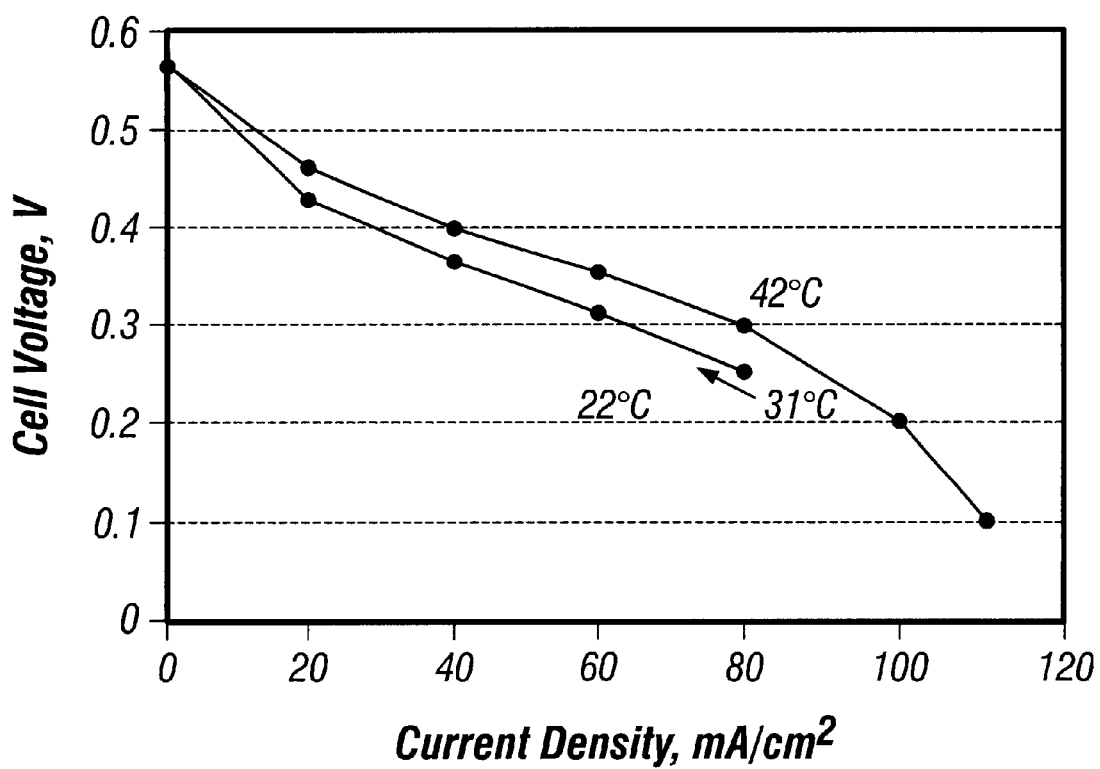
FIG. 3 is a graph illustrating the electrical performance of an exemplary embodiment of the present invention.

A fuel cell constructed and arranged in accordance with that shown in FIG. 1 was fabricated and housed in a structure allowing the methanol fuel and hydrogen peroxide reactant to circulate and be absorbed by the electrodes. The methanol had a molarity of about 1, and the hydrogen peroxide was in an aqueous solution at about a 3% concentration [by weight?]. In conducting the experiment, the fuel cell was loaded at different current densities. For a given current density, a steady-state voltage was recorded using an automated testing device. [please provide identification] The results are shown in FIG. 3.

The results demonstrate that the fuel cell is a viable power source capable of sustaining several tens of watts per square cm. Higher current and power densities can be attained, however, by increasing the concentration of the methanol and/or hydrogen peroxide. Increased electrical performance would also be realized by operating the cell at higher temperatures as demonstrated by the graph.

The method, embodiments and experimental results shown herein are merely illustrative and exemplary of the invention and should not be construed as limiting the scope of the invention.

What is claimed:

1. A fuel cell comprising:
   an electrical load,
   an anode including a catalyst,
   a cathode including a catalyst,
   a proton conducting membrane,
   a methanol source, and
   a hydrogen peroxide source that feeds a hydrogen peroxide solution to the cathode for reaction.

2. The fuel cell of claim 1 wherein the proton conducting membrane is constructed from a perfluorinated sulfonic acid polymer.

3. The fuel cell of claim 1 wherein the proton conducting membrane is constructed from a co-polymer of tetrafluoroethylene and perfluorovinylether sulfonic acid.

4. The fuel cell of claim 1 wherein the anode includes a platinum-ruthenium catalyst.

5. The fuel cell of claim 4 wherein the cathode includes a platinum catalyst.

6. The fuel cell of claim 1 wherein the anode and cathode catalysts are particles in supported or unsupported layer configuration on a carbon fiber sheet backing.

7. The fuel cell of claim 1 wherein the cathode includes an ion conductor and a catalyst layer comprising the catalyst, an oxygen solvent agent, and a hydrophilic wetting agent, and wherein the anode includes an ion conductor and a catalyst layer comprising the catalyst, and a hydrophilic wetting agent.

8. The fuel cell of claim 7 wherein the hydrophilic wetting agent is a member selected from the group consisting of a polymeric perfluorosulfonic acid, a polyhydrocarbon sulfonic acid, a polyetherketonesulfonic acid, a polyethersulfone sulfonic acid and a polybenzimidazole.

9. The fuel cell of claim 7 wherein the wetting agent is a compound having perfluorocarbon moieties, and the ion conductor is a carbon fiber sheet backing.

10. The fuel cell of claim 9 wherein the wetting agent is a material selected from the group consisting of polytetrafluoroethylene and a co-polymer of tetrafluoroethylene and perfluorovinylether sulfonic acid.

11. The fuel cell of claim 8 wherein the oxygen solvent agent is a material selected from the group consisting of a co-polymer of tetrafluoroethylene and perfluorovinylether sulfonic acid and a polytetrafluoroethylene.

12. The fuel cell of claim 1 further comprising a separator for maintaining concentration of the hydrogen peroxide in the cathode and a pump for recycling the hydrogen peroxide to the cathode.

13. The fuel cell of claim 12 wherein the separator includes a hydrogen peroxide selective membrane.

14. The fuel cell of claim 13 further including an evaporator and condenser for conserving water removed by the separator.

15. The fuel cell of claim 1 further comprising a pump for recycling unreacted methanol to the anode.

16. The fuel cell of claim 1 wherein the methanol is in a concentration of about 0.25 to 3.0 molar.

17. The fuel cell of claim 1 wherein the hydrogen peroxide is in a concentration of about 1–30% volume/volume.

18. The fuel cell of claim 1 wherein the hydrogen peroxide is in a concentration of about 3–5% volume/volume.

19. A fuel cell comprising:
   an electrical load,
   an anode including a catalyst,
   a cathode including a catalyst,
   a proton conducting means,
   a methanol source, and
   a hydrogen peroxide source that feeds a hydrogen peroxide solution to the cathode for reaction.

20. The fuel cell of claim 19 further comprising:
   means for maintaining the concentration of hydrogen peroxide in the cathode, and
   means for recycling hydrogen peroxide to the cathode.

21. The fuel cell of claim 19 further comprising means for recycling unreacted methanol to the anode.

22. A method of generating electrical energy in a fuel cell comprising:
   electrochemically reacting methanol in an anode chamber, and
   electrochemically reacting hydrogen peroxide in a cathode chamber.

23. The method of claim 22 further including:
   recycling unreacted methanol to the anode chamber,
   maintaining an electrochemically sufficient concentration of hydrogen peroxide, and
   recycling unreacted hydrogen peroxide to the cathode chamber.

* * * * *